United States Patent
Kim et al.

(10) Patent No.: US 10,263,671 B2
(45) Date of Patent: Apr. 16, 2019

(54) METHOD FOR REPORTING REFERENCE SIGNAL INDICATOR TO BASE STATION BY TERMINAL IN WIRELESS COMMUNICATION SYSTEM AND APPARATUS THEREFOR

(71) Applicant: LG ELECTRONICS INC., Seoul (KR)

(72) Inventors: Hyungtae Kim, Seoul (KR); Jonghyun Park, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/760,063

(22) PCT Filed: Dec. 27, 2016

(86) PCT No.: PCT/KR2016/015343
§ 371 (c)(1),
(2) Date: Mar. 14, 2018

(87) PCT Pub. No.: WO2017/116119
PCT Pub. Date: Jul. 6, 2017

(65) Prior Publication Data
US 2018/0278301 A1   Sep. 27, 2018

Related U.S. Application Data

(60) Provisional application No. 62/273,440, filed on Dec. 31, 2015.

(51) Int. Cl.
*H04B 7/0417* (2017.01)
*H04B 7/04* (2017.01)
(Continued)

(52) U.S. Cl.
CPC ............. *H04B 7/0417* (2013.01); *H04B 7/04* (2013.01); *H04B 7/046* (2013.01); *H04B 7/06* (2013.01);
(Continued)

(58) Field of Classification Search
CPC .... H04B 7/0417; H04B 7/046; H04B 7/0626; H04B 7/04; H04L 5/0051; H04L 5/06;
(Continued)

(56) References Cited

U.S. PATENT DOCUMENTS

| | | | |
|---|---|---|---|
| 2013/0021926 A1 | 1/2013 | Geirhofer et al. | |
| 2013/0028109 A1 * | 1/2013 | Jongren | H04W 16/32 370/252 |

(Continued)

FOREIGN PATENT DOCUMENTS

| | | | |
|---|---|---|---|
| WO | WO 2014/062029 A1 | 4/2014 | |
| WO | WO 2014/073846 A1 | 5/2014 | |
| WO | WO 2014073846 A1 * | 5/2014 | ........... H04B 7/0417 |

*Primary Examiner* — Syed Haider
(74) *Attorney, Agent, or Firm* — Birch, Stewart, Kolasch & Birch, LLP

(57) ABSTRACT

A method for reporting channel status information (CSI) to a base station by a terminal in a wireless access system is disclosed in the present application. The method comprises the steps of: receiving information on one CSI process including a plurality of reference signal resources from the base station; receiving reference signals corresponding to the plurality of reference signal resources from the base station; selecting two or more reference signal resources among the plurality of reference signal resources on the basis of the received reference signals; and reporting the CSI corresponding to the one CSI process to the base station, wherein the CSI includes indicators indicating the two or more reference signal resources.

10 Claims, 8 Drawing Sheets

(51) Int. Cl.
*H04B 7/06* (2006.01)
*H04B 7/0456* (2017.01)
*H04L 5/00* (2006.01)
*H04W 72/02* (2009.01)
*H04W 72/04* (2009.01)
*H04W 72/08* (2009.01)

(52) U.S. Cl.
CPC ........... *H04L 5/0051* (2013.01); *H04W 72/02* (2013.01); *H04W 72/0413* (2013.01); *H04W 72/085* (2013.01); *H04B 7/0626* (2013.01)

(58) Field of Classification Search
CPC ............. H04W 72/02; H04W 72/0413; H04W 72/085
See application file for complete search history.

(56) References Cited

U.S. PATENT DOCUMENTS

| | | | |
|---|---|---|---|
| 2014/0056156 A1 | 2/2014 | Jöngren | |
| 2015/0200757 A1* | 7/2015 | Wu | H04B 7/0456 370/329 |
| 2016/0149670 A1* | 5/2016 | Kim | H04L 1/0618 375/267 |
| 2016/0174093 A1* | 6/2016 | Zhou | H04L 5/0057 370/252 |

\* cited by examiner (a)

(b)

Antenna element    Antenna port

METHOD FOR REPORTING REFERENCE SIGNAL INDICATOR TO BASE STATION BY TERMINAL IN WIRELESS COMMUNICATION SYSTEM AND APPARATUS THEREFOR

CROSS REFERENCE TO RELATED APPLICATIONS

This application is the National Phase of PCT International Application No. PCT/KR2016/015343, filed on Dec. 27, 2016, which claims priority under 35 U.S.C. 119(e) to U.S. Provisional Application No. 62/273,440, filed on Dec. 31, 2015, all of which are hereby expressly incorporated by reference into the present application.

TECHNICAL FIELD

The present invention relates to a wireless communication system, and more particularly, to a method for a user equipment to report a reference signal indicator to a base station in a wireless communication system and an apparatus therefor.

BACKGROUND ART

MIMO (multi-input multi-output) technology corresponds to a technology for increasing data transmission and reception efficiency using a plurality of transmission antennas and a plurality of reception antennas instead of using a single transmission antenna and a single reception antenna. If a single antenna is used, a receiving end receives data through a single antenna path. On the contrary, if multiple antennas are used, the receiving end receives data through several paths, thereby enhancing transmission speed and transmission capacity and increasing coverage.

A single-cell MIMO operation can be divided into a single user-MIMO (SU-MIMO) scheme that a single user equipment (UE) receives a downlink signal in a single cell and a multi user-MIMO (MU-MIMO) scheme that two or more UEs receive a downlink signal in a single cell.

Channel estimation corresponds to a procedure of restoring a received signal by compensating a distortion of the signal distorted by fading. In this case, the fading corresponds to a phenomenon of rapidly changing strength of a signal due to multi-path time delay in wireless communication system environment. In order to perform the channel estimation, it is necessary to have a reference signal known to both a transmitter and a receiver. The reference signal can be simply referred to as an RS (reference signal) or a pilot depending on a standard applied thereto.

A downlink reference signal corresponds to a pilot signal for coherently demodulating PDSCH (physical downlink shared channel), PCFICH (physical control format indicator channel), PHICH (physical hybrid indicator channel), PDCCH (physical downlink control channel) and the like. A downlink reference signal can be classified into a common reference signal (CRS) shared by all UEs within a cell and a dedicated reference signal (DRS) used for a specific UE only. Compared to a legacy communication system supporting 4 transmission antennas (e.g., a system according to LTE release 8 or 9 standard), a system including an extended antenna configuration (e.g., a system according to LTE-A standard supporting 8 transmission antennas) is considering DRS-based data demodulation to efficiently manage a reference signal and support an enhanced transmission scheme. In particular, in order to support data transmission through an extended antenna, it may be able to define a DRS for two or more layers. Since a DRS and data are precoded by a same precoder, it is able to easily estimate channel information, which is used for a receiving end to demodulate data, without separate precoding information.

Although a downlink receiving end is able to obtain precoded channel information on an extended antenna configuration through a DRS, it is required for the downlink receiving end to have a separate reference signal except the DRS to obtain channel information which is not precoded. Hence, it is able to define a reference signal for obtaining channel state information (CSI), i.e., a CSI-RS, at a receiving end in a system according to LTE-A standard.

DISCLOSURE OF THE INVENTION

Technical Task

Based on the aforementioned discussion, a method for a user equipment to report a reference signal indicator to a base station in a wireless communication system and an apparatus therefor are proposed in the following.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of reporting CSI (channel status information), which is reported by a user equipment to a base station in a wireless access system, includes the steps of receiving information on a single CSI process consisting of a plurality of reference signal resources from the base station, receiving reference signals corresponding to a plurality of the reference signal resources from the base station, selecting two or more reference signal resources from among a plurality of the reference signal resources based on the received reference signals, and reporting the CSI corresponding to the single CSI process to the base station. In this case, the CSI can include indicators indicating the two or more reference signal resources.

Preferably, the step of selecting the two or more reference signal resources can include the step of selecting the two or more reference signal resources of which a transfer rate is maximized when reference signal-based data signals are received at the same time from the base station. Or, the step of selecting the two or more reference signal resources may include the step of selecting a best reference signal resource of which channel strength is maximized and a worst reference signal resource of which the channel strength is minimized or the step of selecting the two or more reference signal resources in a descending order of channel strength.

To further achieve these and other advantages and in accordance with the purpose of the present invention, according to a different embodiment, a method of receiving CSI (channel status information), which is received by a base station from a user equipment in a wireless access system, includes the steps of transmitting information on a single CSI process consisting of a plurality of reference signal resources to the user equipment, transmitting reference signals corresponding to a plurality of the reference signal resources to the user equipment, and receiving, the CSI corresponding to the single CSI process from the user equipment. In this case, the CSI can include indicators indicating two or more reference signal resources among a plurality of the reference signal resources selected based on the received reference signals.

Preferably, the two or more reference signal resources have a maximum transfer rate when the UE receives reference signal-based data signals corresponding to the two or more reference signal resources at the same time. Or, the two or more reference signal resources may include a best reference signal resource of which channel strength is maximized and a worst reference signal resource of which the channel strength is minimized, Moreover, the two or more reference signal resources can be selected in a descending order of channel strength.

Additionally, it is preferable to provide information on whether the two or more reference signal resources or a single reference signal resource is selected from among a plurality of the reference signal resources to the user equipment.

Moreover, the two or more reference signal resources include a single representative reference signal resource. In this case, indicators indicating the two or more reference signal resources can include a representative index of the single representative reference signal resource and a differential index of the remaining reference signal resource compared to the representative index.

Advantageous Effects

According to embodiments of the present invention, a user equipment can efficiently report a reference signal indicator to a base station in a wireless communication system, i.e., a wireless communication system to which 3D MIMO is applied.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
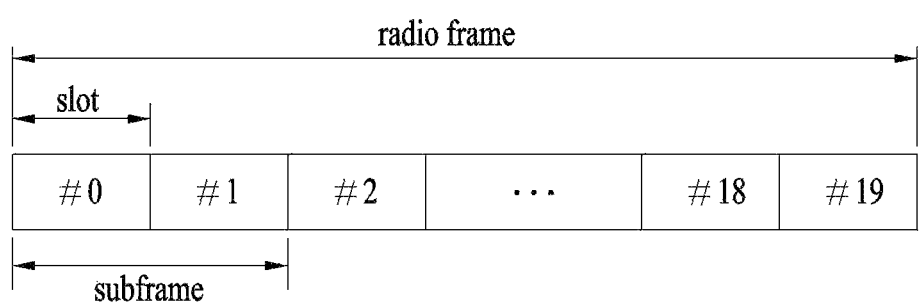
FIG. 1 is a diagram for a structure of a downlink radio frame.

The embodiments described in the following correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment.

In this specification, embodiments of the present invention are described centering on the data transmission/reception relations between a user equipment and an eNode B. In this case, the eNode B may correspond to a terminal node of a network directly performing communication with the user equipment. In this disclosure, a specific operation explained as performed by an eNode B may be performed by an upper node of the eNode B in some cases.

In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like. A terminal may be substituted with such a terminology as a relay node (RN), a relay station (RS), and the like. And, a terminal may be substituted with such a terminology as a user equipment (UE), a mobile station (MS), a mobile subscriber station (MSS), and the like.

Specific terminologies used in the following description are provided to help understand the present invention and the use of the specific terminologies can be modified into a different form in a range of not deviating from the technical idea of the present invention.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Embodiments of the present invention may be supported by the standard documents disclosed in at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless access systems including CDMA (code division multiple access), FDMA (frequency division multiple access), TDMA (time division multiple access). OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE and LTE-A standards, by which the technical idea of the present invention may be non-limited.

A structure of a downlink radio frame is explained in the following with reference to FIG. 1.

Referring to FIG. 1, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 1 is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ins, and one slot may have a length of 0.5 ins. One slot includes a plurality of OFDM symbols in a time domain and a plurality of resource blocks (RB) in a frequency domain. Since the 3GPP LTE system uses OFDM in a downlink, OFDM symbols represent one symbol period. The OFDM symbol may be referred to as SC-FDMA symbol or symbol period. The resource block (RB) as a resource allocation unit may include a plurality of continuous subcarriers in one slot.

The number of OFDM symbols included in one slot may vary depending on a configuration of a cyclic prefix (CP). Examples of the CP include an extended CP and a normal CR. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first two or three OFDM symbols of each subframe may be allocated to a physical downlink control channel (PDCCH), and the other OFDM symbols may be allocated to a physical downlink shared channel (PDSCH).

The aforementioned structure of a radio frame is just an example only. The number of subframes included in a radio frame, the number of slots included in a subframe and the number of symbols included in a slot may be modified in various ways.

Figure 2:
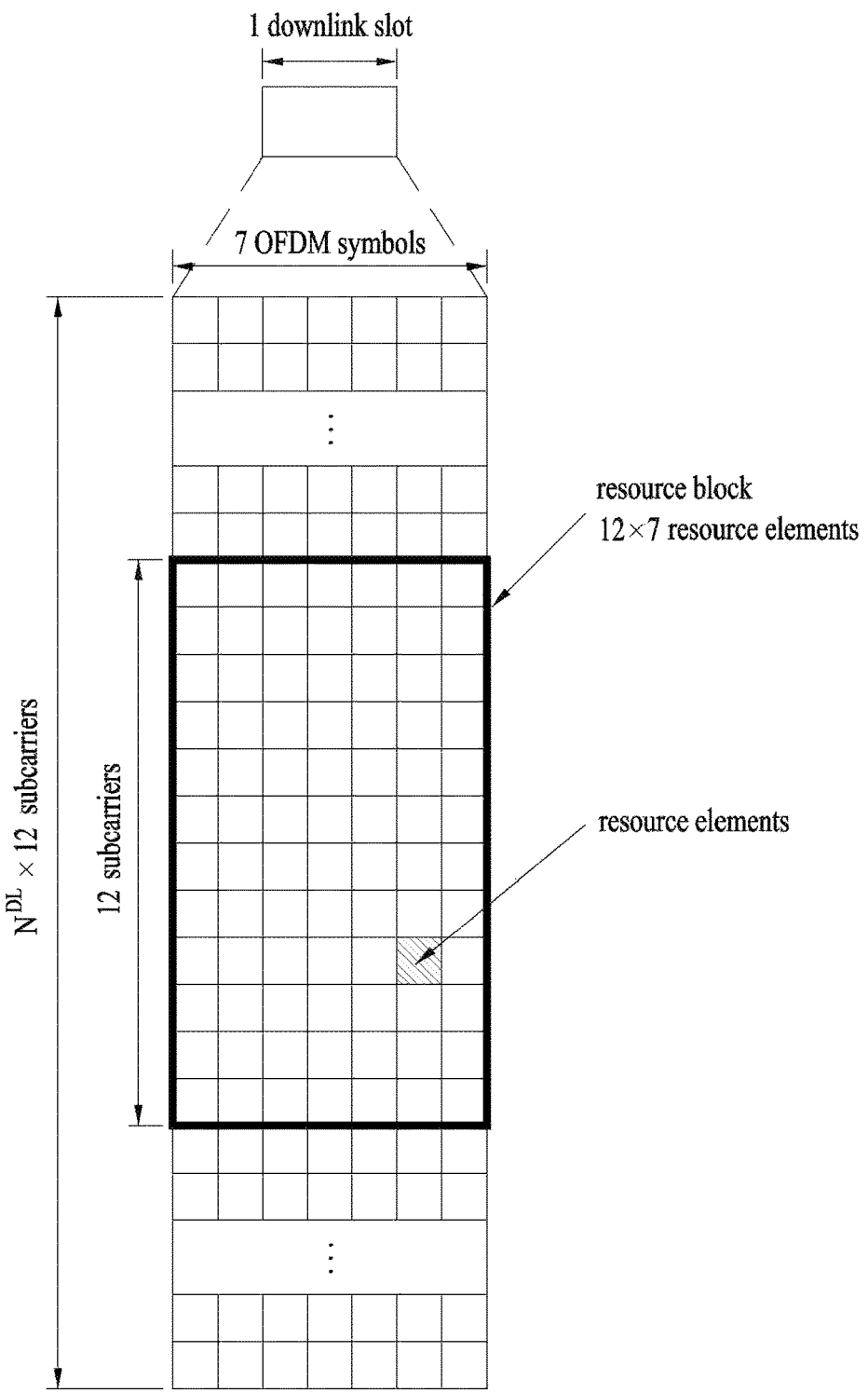
FIG. 2 is a diagram for an example of a resource grid of a downlink slot.

FIG. 2 is a diagram for an example of a resource grid of a downlink slot. FIG. 2 shows a case that an OFDM symbol is configured by a normal CP. Referring to FIG. 2, a downlink slot includes a plurality of OFDM symbols in a time domain and a plurality of resource blocks in a frequency domain. In this case, although FIG. 2 illustrates that a downlink slot includes seven OFDM symbols and a resource block includes twelve subcarriers, by which the present invention may be non-limited. Each element on the resource grid will be referred to as a resource element (RE). For example, an RE a (k, l) may correspond to an RE positioned at a kth subcarrier and an lth OFDM symbol. In case of a normal CP, one resource block includes 12*7 resource elements (in case of an extended CP, one resource block includes 12*6 resource elements). Since a space between subcarriers corresponds to 15 kHz, one resource block includes about 180 kHz in frequency domain. NDL corresponds to the number of resource blocks included in a downlink slot. A value of the NDL can be determined according to a downlink transmission bandwidth scheduled by a base station.

Figure 3:
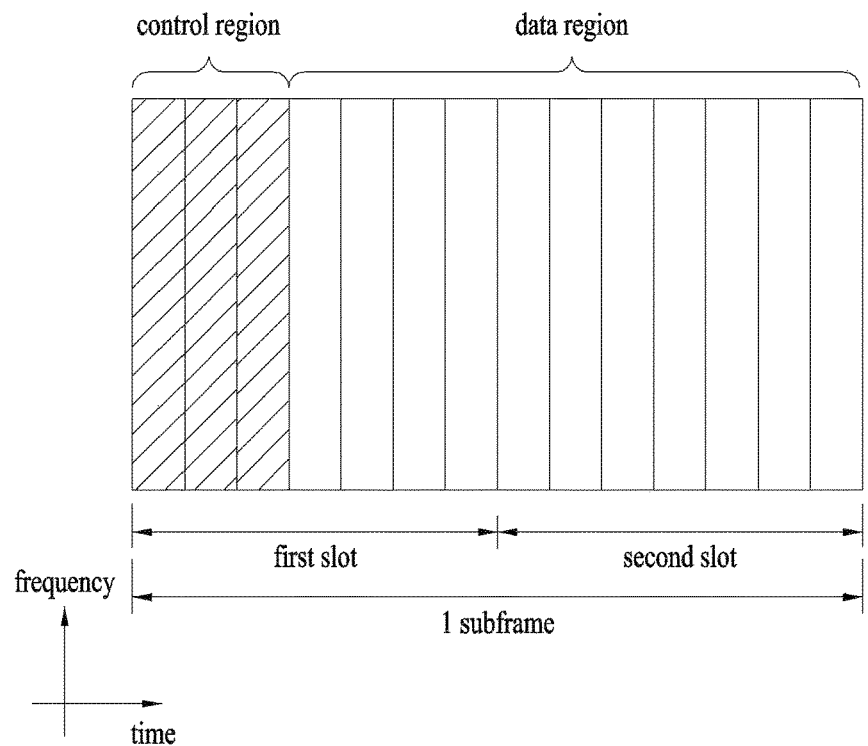
FIG. 3 is a diagram for structure of a downlink subframe.

FIG. 3 is a diagram illustrating a structure of a downlink subframe. Referring to FIG. 3, maximum three OFDM symbols located at the front of the first slot of a subframe correspond to a control region to which a control channel is allocated. The other OFDM symbols correspond to a data region to which a physical downlink shared channel (PDSCH) is allocated. A basic unit of transmission becomes one subframe. In particular, PDCCH and PDSCH are assigned over two slots. Examples of downlink control channels used in the 3GPP LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK signals in response to uplink transmission. The control information transmitted through the PDCCH will be referred to as downlink control information (DCI). The DCI includes uplink or downlink scheduling information, uplink transmission (Tx) power control command for a random UE group and the like. The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on a correlation between the number of CCEs and a coding rate provided by the CCE. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

Figure 4:
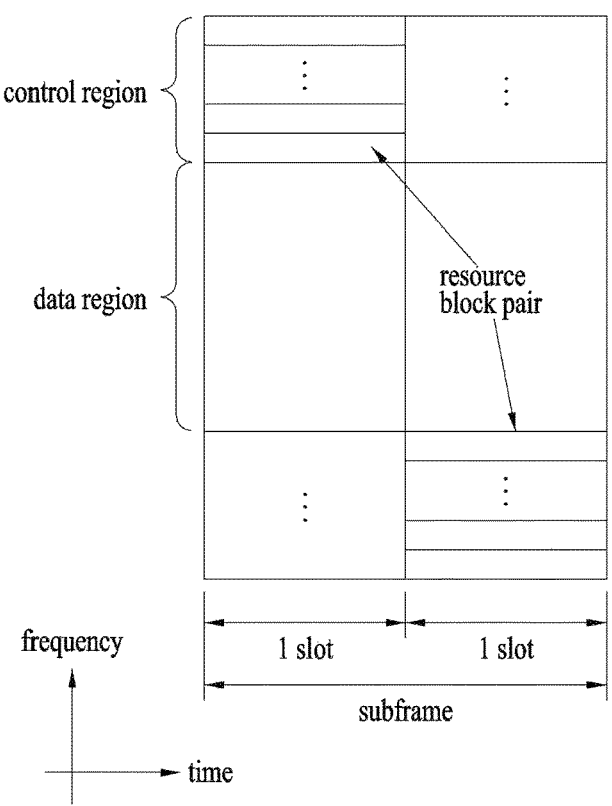
FIG. 4 is a diagram for structure of an uplink subframe.

FIG. 4 is a diagram for structure of an uplink subframe. Referring to FIG. 4, a UL subframe may be divided into a control region and a data region in a frequency domain. A physical uplink control channel (PUCCH) including uplink control information is allocated to the control region and a physical uplink shared channel (PUSCH) including user data is allocated to the data region. In order to maintain single carrier property, a UE does not transmit the PUCCH and the PUSCH at the same time. The PUCCH for one UE is allocated to a resource block pair in a subframe. The resource blocks belonging to the resource block pair occupy a different subcarrier with respect to two slots. This is represented as the resource block pair allocated to the PUCCH is frequency-hopped at a slot boundary.

MIMO System Modeling

Hereinafter, a MIMO system will be described. MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

Figure 5:
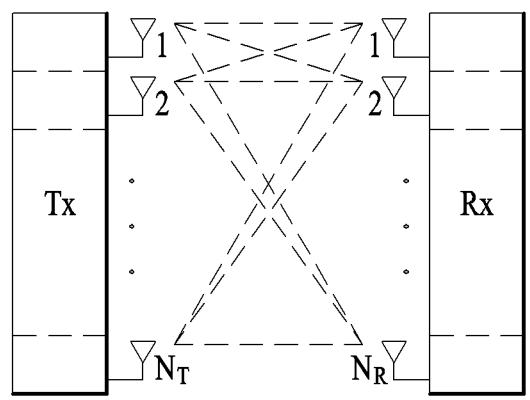
FIG. 5 is a diagram for a configuration of a wireless communication system including a plurality of antennas.
Figure 5:
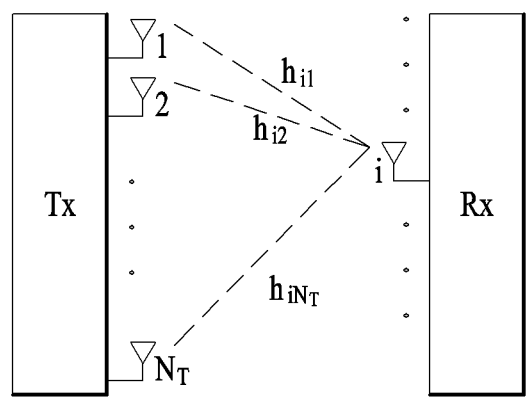

FIG. 5 illustrates the configuration of a typical MIMO communication system. A transmitter has $N_T$ transmit (Tx) antennas and a receiver has $N_R$ receive (Rx) antennas. Use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas, as indicated by Equation 1. $R_i$ is the smaller of $N_T$ and $N_R$.

$$R_i = \min(N_T, N_R) \quad \text{[Equation 1]}$$

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Communication in a MIMO system will be described in detail through mathematical modeling. It is assumed that $N_T$ Tx antennas and $N_R$ Rx antennas are present as illustrated in FIG. 5. Regarding a transmission signal, up to $N_T$ pieces of information can be transmitted through the $N_T$ Tx antennas, as expressed as the following vector.

$$s = [s_1, s_2, \Lambda, s_{N_T}]^T \quad \text{[Equation 2]}$$

Individual pieces of the transmission information $s_1$, $s_2$, ..., $s_{N_T}$ may have different transmit powers. If the individual transmit powers are denoted by $P_1, P_2, \ldots, P_{N_T}$, respectively, then the transmission power-controlled transmission information may be given as $$\hat{s} = [\hat{s}_1, \hat{s}_2, \Lambda, \hat{s}_{N_T}]^T = [P_1 s_1, P_2 s_2, \Lambda, P_{N_T} s_{N_T}]^T \quad \text{[Equation 3]}$$

The transmission power-controlled transmission information vector $\hat{s}$ may be expressed below, using a diagonal matrix P of transmission power.

$$\hat{s} = \begin{bmatrix} P_1 & & & 0 \\ & P_2 & & \\ & & O & \\ 0 & & & P_{N_T} \end{bmatrix} \begin{bmatrix} s_1 \\ s_2 \\ M \\ s_{N_T} \end{bmatrix} = Ps \quad \text{[Equation 4]}$$

Meanwhile, $N_T$ transmission signals $x_1, x_2, \ldots, x_{N_T}$ to be actually transmitted may be configured by multiplying the transmission power-controlled information vector $\hat{s}$ by a weight matrix W. The weight matrix W functions to appropriately distribute the transmission information to individual antennas according to transmission channel states, etc. The transmission signals $x_1, x_2, \ldots, x_{N_T}$ are represented as a vector X, which may be determined by Equation 5. Here, $w_{ij}$ denotes a weight of an i-th Tx antenna and a j-th piece of information. W is referred to as a weight matrix or a precoding matrix.

$$x = \begin{bmatrix} x_1 \\ x_2 \\ M \\ x_i \\ M \\ x_{N_T} \end{bmatrix} = \begin{bmatrix} w_{11} & w_{12} & \Lambda & w_{1N_T} \\ w_{21} & w_{22} & \Lambda & w_{2N_T} \\ M & & O & \\ w_{i1} & w_{i2} & \Lambda & w_{iN_T} \\ M & & O & \\ w_{N_T 1} & w_{N_T 2} & \Lambda & w_{N_T N_T} \end{bmatrix} \begin{bmatrix} \hat{s}_1 \\ \hat{s}_2 \\ M \\ \hat{s}_j \\ M \\ \hat{s}_{N_T} \end{bmatrix} = W\hat{s} = WPs \quad \text{[Equation 5]}$$

Generally, the physical meaning of the rank of a channel matrix is the maximum number of different pieces of information that can be transmitted on a given channel. Therefore, the rank of a channel matrix is defined as the smaller of the number of independent rows and the number of independent columns in the channel matrix. Accordingly, the rank of the channel matrix is not larger than the number of rows or columns of the channel matrix. The rank of the channel matrix H (rank(H)) is restricted as follows.

$$\text{rank}(H) \leq \min(N_T, N_R) \quad \text{[Equation 6]}$$

A different piece of information transmitted in MIMO is referred to as a transmission stream or stream. A stream may also be called a layer. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \quad \text{[Equation 7]}$$

"# of streams" denotes the number of streams. It should be noted that one stream may be transmitted through one or more antennas.

One or more streams may be mapped to a plurality of antennas in many ways. This method may be described as follows depending on MIMO schemes. If one stream is transmitted through a plurality of antennas, this may be regarded as spatial diversity. When a plurality of streams is transmitted through a plurality of antennas, this may be spatial multiplexing. A hybrid scheme of spatial diversity and spatial multiplexing may be contemplated.

CoMP (Coordinated Multi Point) Transmission Scheme

Meanwhile, it is expected that a LTE-A system, which is a standard of a next generation mobile communication system, will support a CoMP (coordinated multi point) transmission method, which is not supported by the conventional standard, to enhance a data transmission rate. In this case, the CoMP transmission method is a transmission method for two or more base stations or cells to communicate with the user equipment in a manner of cooperating with each other to enhance a communication performance between the user equipment situated at a radio shadow zone and the base station (a cell or a sector).

The CoMP transmission method can be classified into a join processing (CoMP-joint processing, CoMP-JP) method in the form of a cooperative MIMO via data sharing and a coordinated scheduling/beamforming (CoMP-coordinated scheduling/beamforming, CoMP-CS/CB) method.

According to the joint processing (CoMP-JP) method in DL, a user equipment may be able to instantaneously receive data simultaneously from each of the base stations performing the CoMP transmission method. And, a reception performance can be enhanced in a manner of combining the signals received from each of the base stations (Joint Transmission (JT)). And, it is also possible to consider a method of transmitting a data to the user equipment on a specific timing by one of the base stations performing the CoMP transmission method (Dynamic Point Selection (DPS)).

On the other hand, according to the coordinated scheduling/beamforming method (CoMP-CS/CB), the user equipment may be able to instantaneously receive data from a single base station via a beamforming.

According to the joint processing (CoMP-JP) method in UL, each of the base stations may be able to simultaneously receive PUSCH signal from the user equipment (Joint Reception (JR)). On the other hand, according to the coordinated scheduling/beamforming method (CoMP-CS/CB), only a single base station may be able to receive the PUSCH.

In this case, the decision to use the coordinated scheduling/beamforming method is determined by the coordinating cells (or base stations).

CSI Feedback

Hereinbelow, a description of channel state information (CSI) reporting will be given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI in order to obtain multiplexing gain of MIMO antennas. To acquire CSI from the UE, the eNB transmits RSs to the UE and commands the UE to feed back CSI measured based on the RSs through a PUCCH or a PUSCH.

CSI is divided into three types of information: an RI, a PMI, and a CQI. First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a preceding matrix index of the eNB preferred by the UE based on a metric of signal-to-interference plus noise ratio (SINR). Lastly, CQI is information indicating the strength of a channel and indicates a reception SINR obtainable when the eNB uses PMI.

An advanced system such as an LTE-A system considers additional multi-user diversity through multi-user MIMO (MU-MIMO). Due to interference between UEs multiplexed in an antenna domain in MU-MIMO, the accuracy of CSI may significantly affect interference with other multiplexed UEs as well as a UE that reports the CSI. Accordingly, more accurate CSI than in single-user MIMO (SU-MIMO) should be reported in MU-MIMO.

In this context, the LTE-A standard has determined to separately design a final PMI as a long-term and/or wideband PMI, W1, and a short-term and/or subband PMI, W2.

For example, a long-term covariance matrix of channels expressed as Equation 8 may be used for hierarchical codebook transformation that configures one final PMI with W1 and W2.

$$W = \text{norm}(W1\,W2) \quad \text{[Equation 8]}$$

In Equation 8, W2 is a short-term PMI, which is a codeword of a codebook reflecting short-term channel information, W is a codeword of a final codebook, and norm(A) is a matrix obtained by normalizing each column of matrix A to 1.

Conventionally, the codewords W1 and W2 are given as Equation 9.

$$W1(i) = \begin{bmatrix} X_i & 0 \\ 0 & X_i \end{bmatrix}, \text{ where } X_i \text{ is } Nt/2 \text{ by } M \text{ matrix.} \quad \text{[Equation 9]}$$

$$W2(j) = \overbrace{\begin{bmatrix} e_M^k & e_M^l & \cdots & e_M^m \\ \alpha_j e_M^k & \beta_j e_M^l & \cdots & \gamma_j e_M^m \end{bmatrix}}^{r \text{ columns}} \text{ (if rank = } r\text{),}$$

where $1 \leq k, l, m \leq M$ and $k, l, m$ are integer.

where Nt is the number of Tx antennas, M is the number of columns of a matrix Xi, indicating that the matrix Xi includes a total of M candidate column vectors, eMk, eMl, and eMm denote k-th, l-th, and m-th column vectors of the matrix Xi in which only k-th, l-th, and m-th elements among M elements are 0 and the other elements are 0, respectively. $\alpha_j$, $\beta_j$, and $\gamma_j$ are complex values each having a unit norm and indicate that, when the k-th, l-th, and m-th column vectors of the matrix Xi are selected, phase rotation is applied to the column vectors. At this time, i is an integer greater than 0, denoting a PMI index indicating W1 and j is an integer greater than 0, denoting a PMI index indicating W2.

In Equation 9, the codewords are designed so as to reflect correlation characteristics between established channels, if cross-polarized antennas are densely arranged, for example, the distance between adjacent antennas is equal to or less than half a signal wavelength. The cross-polarized antennas may be divided into a horizontal antenna group and a vertical antenna group and the two antenna groups are co-located, each having the property of a uniform linear array (ULA) antenna.

Therefore, the correlations between antennas in each group have the same linear phase increment property and the correlation between the antenna groups is characterized by phase rotation. Since a codebook is quantized values of channels, it is necessary to design a codebook reflecting channel characteristics. For convenience of description, a rank-1 codeword designed in the above manner may be given as Equation 10.

$$W1(i) * W2(j) = \begin{bmatrix} X_i(k) \\ \alpha_j X_i(k) \end{bmatrix} \quad \text{[Equation 10]}$$

In Equation 10, a codeword is expressed as an $N_T \times 1$ vector where NT is the number of Tx antennas and the codeword is composed of an upper vector $X_i(k)$ and a lower vector $\alpha_j X_i(k)$, representing the correlation characteristics of the horizontal and vertical antenna groups, respectively. $X_i(k)$ is expressed as a vector having the linear phase increment property, reflecting the correlation characteristics between antennas in each antenna group. For example, a discrete Fourier transform (DFT) matrix may be used for $X_i(k)$.

As mentioned in the foregoing description, channel state information (CSI) includes CQI, PMI, RI, and the like in LTE system. All or a part of the CQI, the PMI, and the RI is transmitted depending on a transmission mode of a UE. When the CSI is periodically transmitted, it is referred to as periodic reporting. When the CSI is transmitted upon the request of a base station, it is referred to as aperiodic reporting. In case of the aperiodic reporting, a request bit, which is included in uplink scheduling information transmitted by a base station, is transmitted to a UE. The UE forwards CSI to the base station via a data channel (PUSCH) in consideration of a transmission mode of the UE. In case of the periodic reporting, a period and an offset in the period are signaled in a unit of a subframe according to a UE using a semi-static scheme via higher layer signaling. A UE forwards CSI to a base station via an uplink control channel (PUCCH) according to a determined period in consideration of a transmission mode. If uplink data exists at the same time in a subframe in which CSI is transmitted, the CSI is transmitted via an uplink data channel (PUSCH) together with the data. The base station transmits transmission timing information appropriate for a UE to the UE in consideration of a channel status of each UE, a UE distribution status in a cell, and the like. The transmission timing information includes a period for transmitting CSI, offset, and the like and can be transmitted to each UE via an RRC message.

LTE system includes 4 types of CQI reporting mode. Specifically, the CQI reporting mode is divided into WB CQI and SB CQI according to a CQI feedback type and is divided into no PMI and single PMI depending on whether PMI is transmitted or not. In order to periodically report CQI, each UE receives information consisting of a combination of a period and an offset via RRC signaling.

CSI reporting types defined in LTE release-10 are described in the following.

A type 1 report supports CQI feedback for a UE on a selected subband. A type 1a report supports subband CQI and second PMI feedback. A type 2, a type 2b, and a type 2c reports support wideband CQI and PMI feedback. A type 2a report supports wideband PMI feedback. A type 3 report supports RI feedback. A type 4 report supports wideband CQI. A type 5 report supports RI and wideband PMI feedback. A type 6 report supports RI and PTI (precoding type indicator) feedback.

Massive MIMO

A recent wireless communication system considers introducing an active antenna system (hereinafter, AAS). Unlike a legacy passive antenna system that an amplifier capable of adjusting a phase and a size of a signal is separated from an antenna, the AAS corresponds to a system that each antenna is configured as an active antenna including such an active circuit as an amplifier. Since the AAS uses an active antenna, it is not necessary for the AAS to have a separate cable for connecting an amplifier with an antenna, a connector, other hardware, and the like. Hence, the AAS has characteristics that efficiency is high in terms of energy and management cost. In particular, since the AAS supports an electronic beam control scheme according to each antenna, the AAS enables an evolved MIMO technique such as forming a delicate beam pattern in consideration of a beam direction and a beam width, forming a 3D beam pattern, and the like.

As the evolved antenna system such as the AAS and the like is introduced, a massive MIMO structure including a plurality of input/output antennas and multi-dimensional antenna structure are also considered. As an example, in case of forming a 2D antenna array instead of a legacy straight antenna array, it may be able to form a 3D beam pattern by the active antenna of the AAS.

Figure 6:
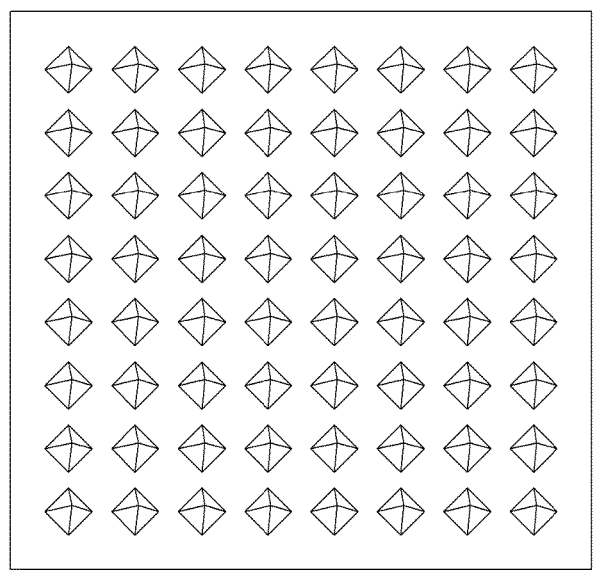
FIG. 6 illustrates a 2D active antenna system having 64 antenna elements.

FIG. 6 illustrates a 2D active antenna system having 64 antenna elements.

Referring to FIG. 6, it is able to see that $N_i = N_v \cdot N_h$ number of antennas forms a shape of square. In particular, $N_h$ and $N_v$ indicate the number of antenna columns in horizontal direction and the number of antenna rows in vertical direction, respectively.

If the 3D beam pattern is utilized in the aspect of a transmission antenna, it may be able to perform semi-static or dynamic beam forming not only in horizontal direction but also in vertical direction of a beam. As an example, it may consider such an application as sector forming in vertical direction and the like. In the aspect of a reception antenna, when a reception beam is formed using massive antennas, it may be able to expect a signal power increasing effect according to an antenna array gain. Hence, in case of uplink, an eNB is able to receive a signal transmitted from a HE through a plurality of antennas. In this case, in order to reduce interference impact, the UE can configure transmit power of the UE to be very low in consideration of a gain of massive reception antennas.

Figure 7:
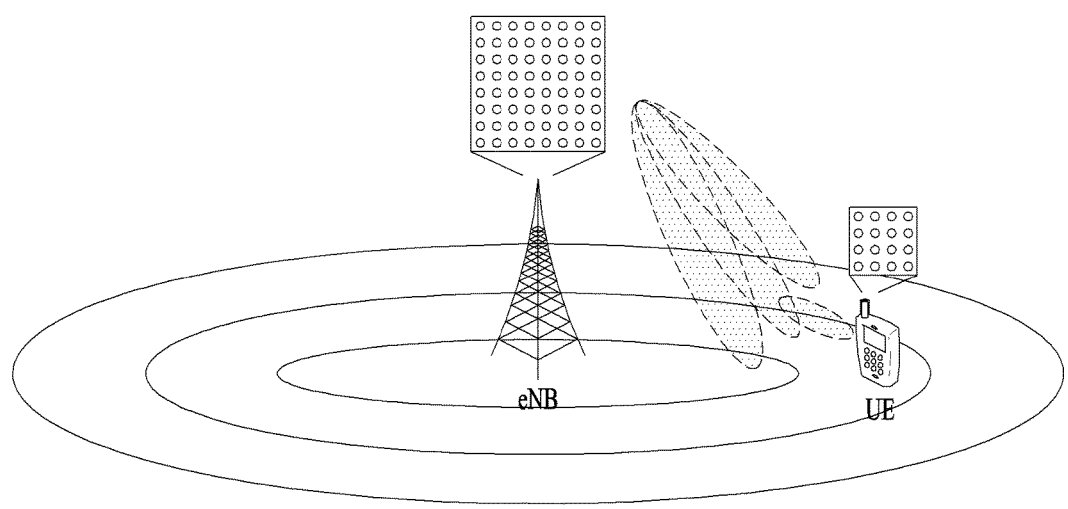
FIG. 7 illustrates a 3D-MIMO system utilizing 2D-AAS.

FIG. 7 illustrates a 3D-MIMO system utilizing 2D-AAS. In particular, FIG. 7 shows a system that an eNB or a UE has a plurality of transmission/reception antennas capable of forming an AAS-based 3D beam.

Meanwhile, an antenna port corresponds to a concept of a logical antenna and does not mean an actual antenna element. Hence, the antenna port and the antenna element itself can be referred to as a virtual antenna and a physical antenna, respectively. A scheme of mapping an antenna port to a physical antenna element is an important element in designing the overall MIMO system. One-to-one mapping for mapping an antenna port to an antenna element and one-to-many mapping for mapping an antenna port to a plurality of antenna elements can be considered as the antenna mapping scheme.

Mapping an antenna port to an antenna element is represented as a virtualization matrix B in equation 11. In this case, x corresponds to a signal transmitted from the antenna port and z corresponds to a signal transmitted from the antenna element. The number of antenna ports can be smaller than the number of antenna elements. Yet, for clarity, assume that the number of antenna ports also corresponds to $N_1$. $b_n$ corresponds to a virtualization vector indicating a relation that an $n^{th}$ antenna port is mapped to antenna elements. If the number of non-zero element of the virtualization vector $b_n$ corresponds to 1, it indicates the one-to-one mapping scheme. If the number of non-zero element of the virtualization vector $b_n$ corresponds to a plural number, it indicates the one-to-many mapping scheme.

$$z = Bx = [b_0 b_1 \wedge b_{N_t-1}] x.$$ [Equation 11]

In equation 11, in order to consider that signal energy of an antenna port and signal energy of an antenna element are the same, assume that a virtualization vector is normalized to $\|b_n\|=1$. In the following, a relation between an antenna element and an antenna port is explained in more detail with reference to the drawing.

Figure 8:
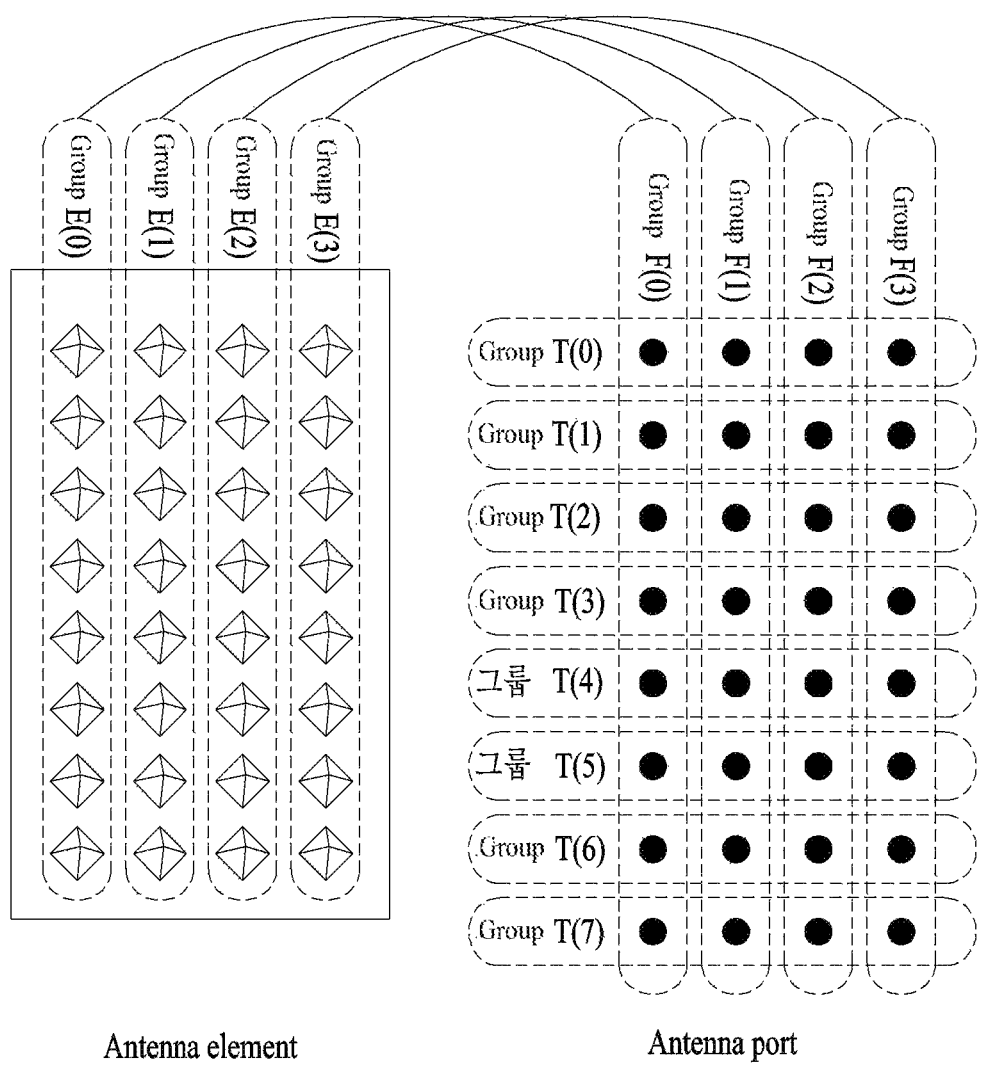
FIG. 8 is a diagram illustrating a relation between an antenna element and an antenna port in 2D AAS system to which massive MIMO is applied.

FIG. 8 illustrates a relation between an antenna element and an antenna port in a 2D AAS system to which massive MIMO is applied. In particular, the left drawing of FIG. 8 shows 32 antenna elements in total, i.e., 32 physical antennas, and the right drawing of FIG. 8 shows 32 antenna ports in total, i.e., 32 logical antennas.

In particular, FIG. 8 shows a grouping scheme of antenna elements and a grouping scheme of antenna ports. FIG. 8 also shows mapping between an antenna element and an antenna port. Referring to FIG. 8, it is able to see that antenna elements are grouped as antenna columns in vertical direction. Specifically, the antenna elements are divided into 4 groups including E(0), E(1), E(2), and E(3). And, the 32 antenna ports are also divided into 4 groups to form groups including F(0), F(1), F(2), and F(3).

In this case, antenna ports belonging to a group F(i) are virtualized using all antenna elements belonging to a group E(i). A virtualization vector of each antenna port belonging to the group F(i) is differently configured. One antenna port is selected from each antenna port group to form a group T(i). Each antenna port belonging to the group T(i) uses an identical virtualization vector to be mapped to a different antenna element group. An RS for each antenna port belonging to the group T(i) is transmitted to an identical OFDM symbol.

In a FD MIMO system, an eNB can set a plurality of CSI-RS resources to a UE in a single CSI process. In this case, the CSI process corresponds to an operation of making a feedback with an independent feedback configuration.

In this case, the UE does not consider each of CSI-RS resources set within a single CSI process as an independent channel. The UE assumes a huge CSI-RS resource by aggregating the CSI-RS resources and calculates and feedbacks CSI based on the huge CSI-RS resource. For example, if the base station sets three 4-port CSI-RS resources belonging to a signal CSI process to the UE, the UE assumes one 12-port CSI-RS resource by aggregating the three 4-port CSI-RS resources. This reporting mode is referred to as Class A reporting in LTE-A system.

Or, the UE assumes each of the CSI-RS resources as an independent channel and selects one from among the CSI-RS resources. The UE calculates and reports CSI on the basis of the selected resource. In particular, the UE selects a CSI-RS of a strong channel from among the 8 CSI-RS resources, calculates CSI on the basis of the selected CSI-RS, and reports the CSI to the base station. In this case, the UE additionally reports the selected CSI-RS to the base station via a CRI (CSI-RS resource indicator) value. For example, if a channel of the first CSI-RS is strongest, the UE configures CRI=0 and reports the first CSI-RS to the base station. This reporting mode is referred to as Class B reporting in LTE-A system.

In order to effectively show the aforementioned characteristic, a variable described in the following can be defined for a CSI process in the class B. K corresponds to the number of CSI-RS resources existing in a CSI process. $N_k$ corresponds to the number of CSI-RS ports of a $k^{th}$ CSI-RS resource. In FIG. 8, K corresponds to 8 and $N_k$ is configured by 4 irrespective of a value of k.

According to a current LTE-A release 13, a CRI indicates a specific CSI-RS resource. Yet, a future CRI may indicate a combination of specific ports of a specific CSI-RS. For example, a CRI selects one from among 8 CSI-RSs belonging to a CSI process and selects a combination of ports 15 and 16 within an additionally selected CSI-RS. If it is able to select either a combination of ports 15 and 16 or a combination of ports 17 and 18 from each of 8 CSI-RSs, a CRI can indicate a value among 16 values. For example, a combination of ports 15 and 16 of a first CSI-RS, a combination of ports 17 and 18 of the first CSI-RS, a combination of ports 15 and 16 of a second CSI-RS, and a combination of ports 17 and 18 of the second CSI-RS can be indicated by CRI=0, CRI=1, CRI=2, and CRI=3, respectively. In particular, a combination of ports 17 and 18 of the last CSI-RS (i.e., $8^{th}$ CSI-RS) is finally mapped to CRI=15.

Embodiment 1

1. (Intra) JT (Joint Transmission) CRI Reporting

A UE reports the N number of CRIs corresponding to the N number of CSI-RS resources among multiple CSI-RS resources defined in a CSI process to a base station. In addition to the N number of CRIs, the UE calculates the N number of CSI (i.e., RI, PMI, or CQI) values on the basis of a CSI-RS resource corresponding to each of the N number of CRIs and reports the N number of CSI values to the base station.

The base station can maximize a transfer rate of the UE or reception SINR using all ports of the N number of CSI-RS resources corresponding to the N number of CRIs when JT transmission is performed.

The N number of CSI corresponds to CSI capable of being achieved by the UE when SU (single user)-MIMO transmission is performed on the basis of each of the N number of CSI-RS resources. Or, the N number of CSI corresponds to an optimized RI and PMI, which are calculated by the UE, applied to an antenna port of each CSI-RS resource when JT transmission is performed using all ports of the N number of CSI-RS resources. In this case, it is promised that the same value is always reported among the N number of RIs.

Although the N numbers of CRIs are reported, a UE can report single CSI only. In this case, the single CSI corresponds to CSI capable of being achieved by the UE when JT transmission is performed using all ports of the N number of CSI-RS resources. For example, the single CSI corresponds to JT RI, JT PMI, and JT CQI capable of being achieved by the UE using all ports of the N number of CSI-RS resources when JT transmission is performed. For example, if the UE reports two CRIs and the number of ports of a CSI-RS corresponding to each of the CRIs corresponds to 2 and 4, respectively, the UE may assume that a CSI-RS is received through 6 ports in total by aggregating 2 ports and 4 ports. The UE also assumes that a downlink channel for calculating CSI has 6 transmission antenna ports. In particular, the UE aggregates a channel H1 estimated from 2 ports and a channel H2 estimated from 4 ports, generates a channel H3 estimated from 6 ports in total, calculates CSI based on the channel H3, and feedbacks the CSI.

2. Worst CRI Reporting

A UE selects a worst CSI-RS of which channel strength is weakest from among a plurality of CSI-RSs defined in a CSI process and reports the selected CSI-RS to a base station as a worst CRI. In addition to the worst CRI, the UE calculates a CSI (RI, PMI, or CQI) value on the basis of the worst CSI-RS and reports the CSI value to the base station.

The CSI corresponds to an RI, a PMI, or a CQI that a maximum CQI capable of achieving a target BLER (block error rate) equal to or less than 0.1 on the basis of the worst CSI-RS is maximized. The CSI is referred to as worst CRI-based best CSI. Legacy CSI corresponds to best CSI capable of being achieved by a UE on the basis of a specific CSI-RS. Since the legacy CSI is calculated on the basis of the best CSI-RS of which channel strength is strongest, the legacy CSI can be referred to as best CRI-based best CSI.

Or, the CSI corresponds to an RI, a PMI, or a CQI that a maximum CQI capable of achieving a target BLER equal to or less than 0.1 on the basis of the worst CSI-RS is minimized. The CSI is referred to as worst CRI-based worst CSI. Or, the CSI corresponds to an RI, a PMI, or a CQI that a maximum CQI capable of achieving a target BEER equal to or less than 0.1 on the basis of a specific CSI-RS is minimized. The CSI is referred to as worst CSI.

Unlike the best CRI-based CSI, the worst CRI-based best CSI and the worst CRI-based worst CSI can be calculated within a specific set of RI. For example, when a UE calculates the worst CRI-based worst CSI, the UE can calculate a PMI and a CQI in a state that RI is always fixed by 1. As a result, the UE reports a worst vertical direction beam and a worst horizontal direction beam to a base station. The UE reports CQI (i.e., reception SINR) capable of being achieved by the UE to the base station using the worst vertical direction beam and the worst horizontal direction beam.

As a different example, when the UE calculates the worst CRI-based worst CSI, the UE can calculate a PMI and a CQI in a state that RI is always fixed by the number of ports (i.e., full rank) of a selected worst CSI-RS. In this case, the UE can calculate CQI under the assumption that there is no inter-layer interference in SU-MIMO. Specifically, when the UE calculates a worst CSI for 2 layers, the UE calculates an CQI by identifying a size of an interference signal using interference measured from an IMR (interference measurement resource) only and obtaining a size of a reception channel capable of being received by an $i^{th}$ beam of a worst PMI. In this case, i corresponds to 1 or 2. In particular, when a UE reports CQI including no inter-layer interference to a base station, if MU (multi user)-MIMO transmission is scheduled to the UE and a different UE using a worst CRI and a worst PMI reported by the UE, the base station is able to easily identify a level of interference received by the UE from the different UE which is scheduled together with the UE.

A worst CRI corresponds to a CSI-RS of which signal strength is lowest. Hence, when a UE receives interference through a corresponding channel, the UE receives least interference. In particular, when MU-MIMO scheduling is performed, a base station transmits data of a co-scheduled UE via a channel corresponding to a worst CRI with reference to the worst CRI reported by the UE to minimize interference influencing on the UE. And, if the UE reports a worst CRI-based worst CSI, the base station transmits data of the co-scheduled UE using worst CSI (i.e., PMI) via a channel corresponding to a worst CRI using the worst CRI-based worst CSI reported by the UE to more minimize interference influencing on the UE. The base station can anticipate a size of data interference of the co-scheduled UE using the worst CQI and can compensate for the best CRI-based best CQI of the UE in consideration of the interference.

3. $2^{nd}$ Best CSI Reporting

A UE selects a CSI-RS of which channel strength is the second strongest from among a plurality of CSI-RSs defined in a CSI process and reports the selected CSI-RS to a base station as a second best CRI. In addition to the $2^{nd}$ best CRI, the UE calculates a CSI (RI, PMI, or CQI) value on the basis of a $2^{nd}$ best CSI-RS and reports the CSI value to the base station.

The CSI corresponds to an RI, a PMI, or a CQI that a maximum CQI capable of achieving a target BLER equal to or less than 0.1 on the basis of the $2^{nd}$ best CSI-RS is maximized. In the present specification, the CSI is referred to as $2^{nd}$ best CRI-based best CSI. Since the legacy CSI is calculated on the basis of the best CSI-RS of which channel strength is strongest, the legacy CSI can be referred to as best CRI-based best CSI.

In a broad sense, it may be able to report not only the $2^{nd}$ best CRI but also an n-th best CRI.

If DL MUST (multiuser superposition transmission) is supported in the future, since reporting of the $2^{nd}$ best CRI increases MUST scheduling possibility, it may help transmission amount to be increased with the help of MUST transmission. According to a current MUST, co-scheduled UEs are restricted to use the same beam. Due to the restriction, it is difficult to find out a co-scheduled UE candidate. In particular, the abovementioned problem is getting worse in environment where traffic load is low. Consequently, it may be difficult to expect the increase of the transmission amount due to the introduction of MUST.

Hence, if a UE reports the $2^{nd}$ best CRI and reports the $2^{nd}$ best CRI-based best CSI, it may increase the number of co-scheduled UE candidates. For example, when a UE 1 and a UE 2 report best CRI-based best CSI (i.e., legacy CSI) only, since a beam of the UE 1 is different from a beam of the UE 2, it is unable to perform MUST scheduling. Yet, if the UEs report $2^{nd}$ best CRI-based best CSI, since a common beam exist between the two UEs, it may be able to perform MUST scheduling.

Embodiment 2

A base station can indicate a UE to perform worst CRI reporting and worst CRI-based worst CSI reporting or worst CRI-based best CSI reporting. And, the base station can indicate the UE to perform $2^{nd}$ best CRI reporting and $2^{nd}$ best CRI-based best CSI reporting. In particular, the base station can indicate the UE to additionally report the worst CRI, $n^{th}$ best CRI, or the like in addition to a legacy best CRI reporting within a single CSI process.

To this end, the base station defines a new reporting mode and a new reporting type capable of reporting multiple CRIs and sets the reporting mode and the reporting type to a UE. Or, the base station can configure whether or not the UE additionally reports the new CRI according to a CSI process. Or, the base station can configure the UE to report multiple CRIs via triggering of aperiodic CSI feedback. For example, according to a current LTE-A system, since it is able to trigger CSI feedback of a predefined CSI process set via RRC signaling using a CQI request field such as a DCI format 0 and a DCI format 4, it may be able to define a CRI to be additionally reported as well as the CSI process set via RRC signaling. A UE concatenates multiple CRIs to be reported according to a predefined concatenation order and reports the concatenated multiple CRIs to the base station. For example, the UE concatenates the multiple CRIs in an order of a best CRI, a worst CRI, and an $n^{th}$ best CRI.

Or, the base station may indicate the UE to report one selected from the group consisting of the legacy best CRI, the worst CRI, and the $n^{th}$ best CRI within a single CSI process. Or, the base station may indicate the UE to report one or more CRIs. To this end, the base station can inform the UE of a CRI to be reported according to a CSI process. Or, the base station can inform the UE of a CRI to be reported via triggering of aperiodic CSI feedback. For example, if CSI feedback of a predefined CSI process set is triggered via RRC signaling using a CQI request field included in a DCI format 0 and a DCI format 4, it may be able to additionally predefine a CRI to be reported as well as a CSI process set via RRC signaling. A UE concatenates multiple CRIs to be reported according to a predefined concatenation order and reports the multiple CRIs to a base station. For example, the UE concatenates the multiple CRIs in an order of a best CRI, a worst CRI, and an $n^{th}$ best CRI.

Moreover, the base station can configure the UE to report the best CSI or the worst CSI via the aforementioned scheme. The UE concatenates multiple CSI to be reported according to a predefined concatenation order and reports the multiple CSI to the base station. For example, the UE concatenates the multiple CSI in an order of best CRI-based best CSI and worst CRI-based worst CSI.

It is preferable to report the aforementioned CRI and CSI calculated based on the CRI together with the legacy best CRI-based best CSI via aperiodic PUSCH CSI feedback.

Embodiment 3

A base station can inform a UE of CRI subset restriction information according to a CSI process. The CRI subset restriction corresponds to a CSI-RS resource capable of being selected and reported by a UE as a CRI among multiple CSI-RS resources defined within a CSI process. The CRI subset corresponds to a subset including partial resources only among the total CSI-RS resources. If the CRI subset restriction is applied, payload sizes (i.e., bit width) of 4 reporting types including CRI, CRI+RI, CRI+RI+PTI, and CRI+RI+W1 can be determined using max $N_k$ among CSI-RS resources restricted by a CRI instead of max $N_k$ corresponding to the maximum number of ports for CSI-RSs included in a CSI process. By doing so, a payload size can be reduced, thereby reducing uplink overhead.

The CRI subset restriction can be differently designated according to a CRI type (i.e., worst CRI, $n^{th}$ best CRI, and legacy best CRI). In particular, the best CRI and the worst CRI may have a different CRI subset. And, the CRI subset restriction can be differently designated according to a subframe set. In particular, a subframe set 0 and a subframe set 1 may have a different CRI subset.

In addition, similar to a CQI, a CRI has a reference CRI and an index difference between the CRI and the reference CRI can be reported using a delta value (i.e., a differential value). For example, a UE reports a legacy best CRI as the reference CRI and reports an index difference with the reference CRI only for the worst CRI, the $n^{th}$ best CRI, and the like.

More specifically, when a wideband CRI and a subband CRI are fed back, a UE reports the wideband CRI as a reference CRI and reports an index difference value with the reference CRI only for the subband CRI. A base station can configure the UE to report the wideband CRI only. Or, the base station can configure the UE to report both the wideband CRI and the subband CRI. This mode can be configured as a new reporting mode.

The base station may inform the UE of a delta CRI value via RRC signaling. Or, the delta CRI value can be defined by a fixed value. For example, 4 states capable of being transmitted by the base station using a delta CRI of a size of 2 bits can be configured as follows via RRC signaling. A state 00, a state 01, a state 10, and a state 11 can be configured by +1, +2, −1, and −2, respectively. When the delta CRI is applied to the reference CRI, it may configure an index to be wraparound to make a CRI not to exceed a range capable of being configured. For example, when a set of CRIs corresponds to {0, 1, 2, 3}, a reference CRI corresponds to 0, and a delta CRI corresponds to −1, a final CRI to which the delta CRI is applied corresponds to 3. In particular, a payload size can be reduced via a delta CRI scheme, thereby reducing uplink overhead.

Embodiment 4

In case of performing Class B CSI reporting, a role of a CRI can be replaced with W2 in a CSI process configured by [K=1, PMI config=1]. In this case, Class B means that it is able to configure one or more CSI-RS resources within a single process. K corresponds to the number of CSI-RSs within a single process. Hence, if the K corresponds to 1, CRI itself is not fed back. And, PMI config=1 has a meaning that W2 is reported only among a precoder configured by a combination of W1 and W2.

Specifically, in case of Class B, K=1, and PMI config=1, phase rotation between a horizontal direction polarization antenna group and a vertical direction polarization antenna group is selected together with beam selection via W2. Consequently, since a role of a CRI is replaced via beam selection of the W2, it may transmit a worst PMI and $2^{nd}$ best PMI instead of the proposed worst CRI and the $2^{nd}$ best CRI in a CSI process where Class B, K=1, and PMI Config=1.

Figure 9:
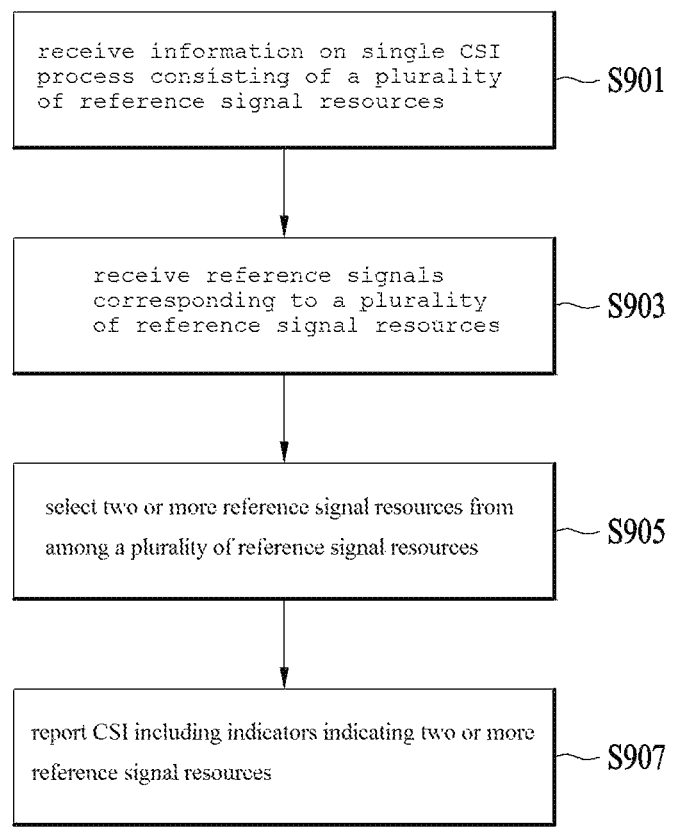
FIG. 9 is a flowchart illustrates a method of reporting CRI according to the present invention.

FIG. 9 is a flowchart illustrates a method of reporting CRI according to the present invention.

Referring to FIG. 9, in the step S901, a UE receives information on a single CSI process including a plurality of reference signal resources from a base station. In the step S903, the UE receives reference signals corresponding to a plurality of the reference signal resources from the base station. In this case, it is preferable that a reference signal corresponds to a CSI-RS.

Subsequently, in the step S905, the UE selects two or more reference signal resources from among a plurality of the reference signal resources based on the received reference signals. In this case, when the UE receives reference signal-based data signals at the same time from the base station for JT, the UE can select the two or more reference signal resources of which a transfer rate is maximized. Or, the UE may select a best reference signal resource of which channel strength is maximized and a worst reference signal resource of which channel strength is minimized for MU-MIMO. In addition, the two or more reference signal resources can be selected in a descending order of channel strength for a UE including an interference cancellation function such as MUST transmission and the like.

Lastly, in the step S907, the UE reports the CSI corresponding to the single CSI process including indicators indicating the two or more reference signal resources to the base station.

In addition, the UE can receive information on whether the two or more reference signal resources or a single reference signal resource is selected from among a plurality of the reference signal resources before the step S905 is performed. Moreover, the two or more reference signal resources may include a single representative reference signal resource. In this case, the indicators indicating the two or more reference signal resources received in the step S907 can include a representative index of the single representative reference signal resource and a differential index indicating a difference between the representative index and the remaining reference signal resources.

Figure 10:
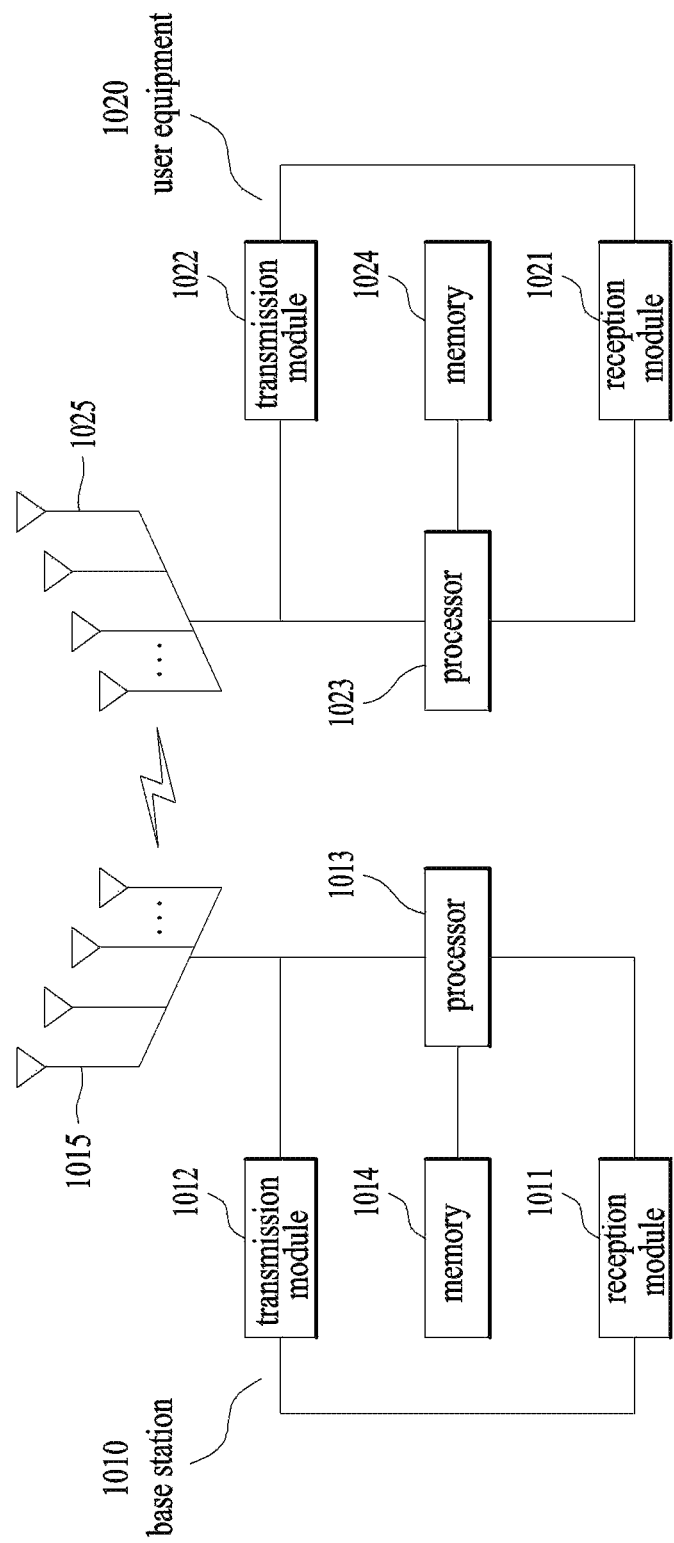
FIG. 10 is a diagram for a configuration of a base station and a user equipment applicable to one embodiment of the present invention.

FIG. 10 is a diagram for a base station and a user equipment capable of being applied to an embodiment of the present invention.

Referring to FIG. 10, a wireless communication system includes a base station (BS) 1010 and a user equipment (UE) 1020. The BS 1010 includes a processor 1013, a memory 1014 and a radio frequency (RF) units 1011/1012. The processor 1013 can be configured to implement the proposed functions, processes and/or methods. The memory 1014 is connected with the processor 1013 and then stores various kinds of information associated with an operation of the processor 1013. The RF units 1011/1012 are connected with the processor 1013 and transmits and/or receives a radio signal.

The user equipment 1020 includes a processor 1023, a memory 1024 and a radio frequency (RF) unit 1021/1022. The processor 1023 can be configured to implement the proposed functions, processes and/or methods. The memory 1024 is connected with the processor 1023 and then stores various kinds of information associated with an operation of the processor 1023. The RF unit 1021/1022 is connected with the processor 1023 and transmits and/or receives a radio signal. The base station 1010 and/or the user equipment 1020 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B a base station (BS), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

Detailed explanation on the preferred embodiment of the present invention disclosed as mentioned in the foregoing description is provided for those in the art to implement and execute the present invention. While the present invention has been described and illustrated herein with reference to the preferred embodiments thereof, it will be apparent to those skilled in the art that various modifications and variations can be made therein without departing from the spirit and scope of the invention. For instance, those skilled in the art can use each component described in the aforementioned embodiments in a manner of combining it with each other. Hence, the present invention may be non-limited to the aforementioned embodiments of the present invention and intends to provide a scope matched with principles and new characteristics disclosed in the present invention.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The present invention can be used for a wireless communication device such as a terminal, a relay, a base station and the like.

What is claimed is:

1. A method of reporting CSI (channel status information) by a user equipment to a base station in a wireless access system, the method comprising:
   receiving information on a CSI process consisting of a plurality of reference signal resources from the base station;
   receiving reference signals corresponding to the plurality of reference signal resources from the base station;
   selecting two or more reference signal resources among the plurality of reference signal resources based on the received reference signals; and
   reporting the CSI corresponding to the CSI process to the base station,
   wherein the CSI comprises indicators indicating the two or more reference signal resources,
   wherein the two or more reference signal resources comprise a representative reference signal resource, and
   wherein the indicators indicating the two or more reference signal resources comprise a representative index of the representative reference signal resource and differential indexes of the remaining reference signal resources compared to the representative index.

2. The method of claim 1, wherein the selecting the two or more reference signal resources comprises selecting the two or more reference signal resources of which a transfer rate is maximized when reference signal-based data signals are received at the same time from the base station.

3. The method of claim 1, wherein the selecting the two or more reference signal resources comprises selecting a best reference signal resource of which a channel strength is maximized and a worst reference signal resource of which the channel strength is minimized.

4. The method of claim 1, wherein the selecting the two or more reference signal resources comprises selecting the two or more reference signal resources in a descending order of a channel strength.

5. The method of claim 1, further comprising receiving information on whether the two or more reference signal resources or one reference signal resource is selected among the plurality of reference signal resources, from the base station.

6. A method of receiving CSI (channel status information) by a base station from a user equipment in a wireless access system, the method comprising:
   transmitting information on a CSI process consisting of a plurality of reference signal resources to the user equipment;
   transmitting reference signals corresponding to the plurality of reference signal resources to the user equipment; and
   receiving the CSI corresponding to the CSI process from the user equipment,
   wherein the CSI comprises indicators indicating two or more reference signal resources selected based on the received reference signals, among the plurality of reference signal resources,
   wherein the two or more reference signal resources comprise a representative reference signal resource, and
   wherein the indicators indicating the two or more reference signal resources comprise a representative index of the representative reference signal resource and differential indexes of the remaining reference signal resources compared to the representative index.

7. The method of claim 6, wherein the two or more reference signal resources have a maximum transfer rate when the user equipment receives reference signal-based data signals corresponding to the two or more reference signal resources at the same time.

8. The method of claim 6, wherein the two or more reference signal resources comprise a best reference signal resource of which a channel strength is maximized and a worst reference signal resource of which the channel strength is minimized.

9. The method of claim 6, wherein the two or more reference signal resources are selected in a descending order of a channel strength.

10. The method of claim 6, further comprising transmitting information on whether the two or more reference signal resources or one reference signal resource is selected among the plurality of reference signal resources, to the user equipment.

* * * * *